United States Patent
Tu et al.

(10) Patent No.: US 6,954,324 B1
(45) Date of Patent: Oct. 11, 2005

(54) DISK DRIVE DISABLING BEMF DETECTION WINDOW TO REDUCE ACOUSTIC NOISE WHILE USING WEDGE SPINDLE SPEED CONTROL

(75) Inventors: Kuang-Yang Tu, Irvine, CA (US); Chuanwen Ji, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 43 days.

(21) Appl. No.: 10/724,331

(22) Filed: Nov. 26, 2003

(51) Int. Cl.[7] ............................................. G11B 15/46
(52) U.S. Cl. ................... 360/73.03; 360/73.01
(58) Field of Search .................. 360/69, 71, 73.01, 360/73.03; 310/67 R, 68 R; 318/495, 268–272; 388/928.1

(56) References Cited

U.S. PATENT DOCUMENTS

| | | | |
|---|---|---|---|
| 5,038,232 A * | 8/1991 | Grace | 360/73.03 |
| 5,218,491 A * | 6/1993 | Nishida et al. | 360/73.03 |
| 6,067,202 A | 5/2000 | Rowan et al. | |
| 6,754,025 B1 | 6/2004 | Shepherd et al. | |
| 2004/0245950 A1 * | 12/2004 | Ang et al. | 318/268 |

* cited by examiner

*Primary Examiner*—David Hudspeth
*Assistant Examiner*—Jason Olson
(74) *Attorney, Agent, or Firm*—Howard H. Sheerin, Esq.

(57) ABSTRACT

A disk drive is disclosed employing either back electromotive force (BEMF) spindle speed control mode or wedge spindle speed control mode. A BEMF detector monitors the BEMF voltage generated by the windings of the spindle motor to generate a BEMF speed error. The BEMF spindle speed control mode is used to spin up the disk to an operating speed, and the wedge spindle speed control to maintain the disk at the operating speed. While in the wedge spindle speed control mode, a BEMF detection window is disabled to reduce acoustic noise.

17 Claims, 5 Drawing Sheets

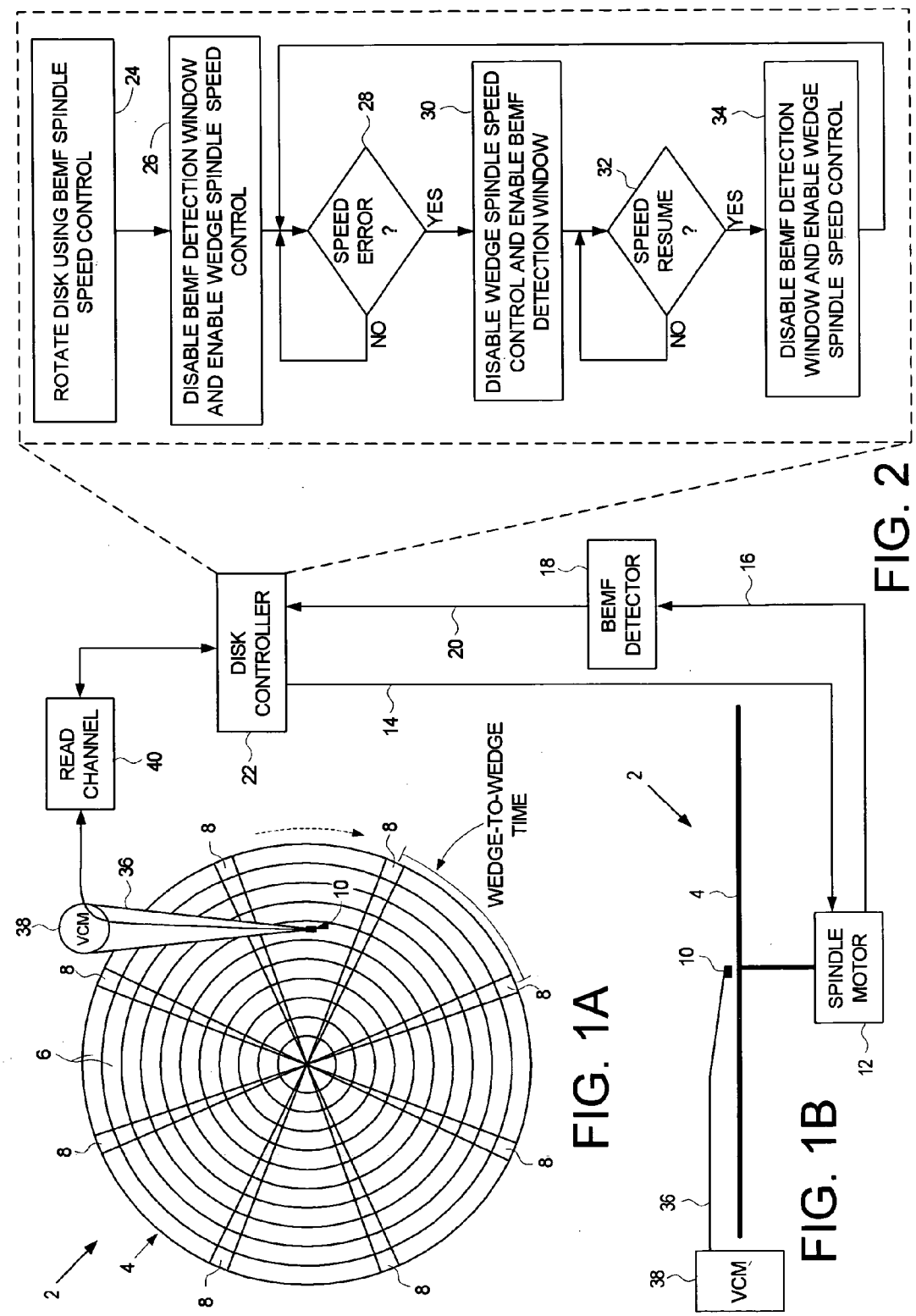

_US 6,954,324 B1_

DISK DRIVE DISABLING BEMF DETECTION WINDOW TO REDUCE ACOUSTIC NOISE WHILE USING WEDGE SPINDLE SPEED CONTROL

BACKGROUND OF THE INVENTION

1. Field of the Invention

The present invention relates to disk drives. In particular, the present invention relates to a disk drive disabling a back electromotive force (BEMF) detection window to reduce acoustic noise while using wedge spindle speed control.

2. Description of the Prior Art

A disk drive typically comprises one or more disks rotated by a spindle motor while heads are actuated radially over the disk surfaces. Each disk surface comprises a number of radially spaced, concentric tracks, where each track is divided into a number of data sectors. A number of embedded servo wedges are also written on each disk surface which facilitate seeking the head and maintaining the head over the centerline of a target track during read and write operations. The disks are rotated at a constant angular velocity (CAV) while varying the data rate from an inner diameter zone to an outer diameter zone to maximize the recording density.

In order to achieve accurate reproduction, it is important to maintain the spindle motor "at speed" while writing data to and reading the data form the disks. To this end, prior art disk drives typically control the spindle speed by monitoring zero crossings in the BEMF voltage generated by the un-energized winding within the spindle motor. The BEMF zero crossings are also used to implement a phase-lock-loop (PLL) commutation clock for clocking a commutation sequencer to energize the appropriate windings at the appropriate time. However, the bandwidth of a spindle speed control loop using BEMF voltage as feedback may be insufficient for a desired recording density or vibration tolerance. In addition, monitoring the BEMF voltage generated by the un-energized windings can cause spike currents creating undesirable acoustic noise.

U.S. Pat. No. 6,067,202 suggests to measure the time between servo sector pulses coincident with detecting each servo wedge, and to generate a speed error by comparing the measured time to a reference time corresponding to the desired spindle speed. Since the servo sector pulses occur more frequently than zero crossings in the BEMF voltage, the bandwidth of the spindle speed control loop increases, allowing for higher recording densities and/or improved vibration tolerance. However, the '202 patent discloses very little implementation details for a spindle speed control loop using servo sector pulses as feedback, and in particular, no implementation details on certain drawbacks associated with the BEMF speed control.

The spindle motor is typically driven in a PWM mode for power efficiency. A BEMF speed controller generates a PWM signal in order to "energize" selected windings of the spindle motor with a chopping current. The BEMF speed controller processes a BEMF speed error measured by detecting zero crossings in the back EMF voltage generated by an un-energized winding. The PWM signal is typically disabled (e.g., held high) during a BEMF detection window to pause the chopping action so that the BEMF zero crossings can be detected accurately. However, disabling the PWM signal causes current transients in the spindle motor windings, which results in acoustic noise, torque/speed jitter, and disk vibration.

There is, therefore, a need to reduce acoustic noise in a disk drive caused by disabling the PWM signal driving the spindle motor during a BEMF detection window.

SUMMARY OF THE INVENTION

The present invention may be regarded as a disk drive comprising a disk having a plurality of tracks, wherein each track comprises a plurality of data sectors and a plurality of servo wedges. A head is actuated radially over the disk, and a spindle motor rotates the disk at an operating speed in response to a spindle control current, wherein the spindle motor comprises a plurality of windings which generate a back electromotive force (BEMF) voltage. A BEMF detector generates a BEMF signal by comparing the BEMF voltage to a threshold. A current modulator generates a PWM signal representing the spindle control current, and BEMF detection window circuitry periodically disables the PWM signal for a predetermined interval to attenuate noise in the BEMF voltage while the BEMF detector compares the BEMF voltage to the threshold. A BEMF speed error is generated in response to the BEMF signal during a BEMF spindle speed control mode. The spindle control current is updated in response to the BEMF speed error to drive the disk at the operating speed. The BEMF detection window circuitry is disabled to reduce acoustic noise and the spindle motor is operated in a wedge spindle speed control mode. A wedge speed error is generated in response to the servo wedges, and the disk is maintained at the operating speed by updating the spindle control current in response to the wedge speed error. If an error condition is detected, the BEMF detection window circuitry is enabled and the disk maintained at the operating speed by updating the spindle control current in response to the BEMF speed error generated from the BEMF signal. When the error condition subsides, the BEMF detection window circuitry is disabled and the disk is maintained at the operating speed by updating the spindle control current in response to the wedge speed error generated from the servo wedges.

In one embodiment, the error condition occurs if the spindle control current is not updated within a predetermined interval. In one embodiment, the spindle control current is not updated if a servo wedge error is detected. A servo wedge error may include an inability to synchronize to a servo wedge, or detecting an invalid track identification value in a servo wedge.

In another embodiment, the disk drive further comprises a commutation sequencer for energizing the windings in a predetermined commutation sequence. The commutation sequencer is clocked in response to the BEMF signal while the BEMF detection window circuitry is enabled, and the commutation sequencer is clocked at a fixed frequency while the BEMF detection window circuitry is disabled. In an alternative embodiment, the commutation sequencer is clocked in response to the BEMF signal while the BEMF detection window circuitry is enabled and while the BEMF detection window circuitry is disabled.

In yet another embodiment, after the error condition is detected the disk controller waits a predetermined interval for the BEMF speed error to settle before updating the spindle control current in response to the BEMF speed error.

The present invention may also be regarded as a method of operating a disk drive, the disk drive comprising a disk having a plurality of tracks, wherein each track comprises a plurality of data sectors and a plurality of servo wedges. A head is actuated over the disk, and a spindle motor rotates the disk at an operating speed in response to a spindle control current. The spindle motor comprising a plurality of windings which generate a back electromotive force (BEMF) voltage, and a BEMF detector generates a BEMF signal by comparing the BEMF voltage to a threshold. A current modulator generates a PWM signal representing the spindle control current, and BEMF detection window circuitry periodically disables the PWM signal for a predetermined interval to attenuate noise in the BEMF voltage while the BEMF detector compares the BEMF voltage to the threshold. A BEMF speed error is measured responsive to the BEMF signal during a BEMF spindle speed control mode, and the spindle control current is updated in response to the BEMF speed error to drive the disk at the operating speed. The BEMF detection window circuitry is disabled to reduce acoustic noise and the spindle motor is operated in a wedge spindle speed control mode. A wedge speed error is measured in response to the servo wedges, and the disk is maintained at the operating speed by updating the spindle control current in response to the wedge speed error. If an error condition is detected, the BEMF detection window circuitry is enabled and the disk is maintained at the operating speed by updating the spindle control current in response to the BEMF speed error generated from the BEMF signal. When the error condition subsides, the BEMF detection window circuitry is disabled and the disk is maintained at the operating speed by updating the spindle control current in response to the wedge speed error generated from the servo wedges.

BRIEF DESCRIPTION OF THE DRAWINGS

FIGS. 1A and 1B show a disk drive according to an embodiment of the present invention comprising a disk having a plurality of servo wedges, a head actuated over the disk, a spindle motor for rotating the disk, and a disk controller.

FIG. 2 is a flow diagram executed by the disk controller according to an embodiment of the present invention wherein BEMF detection window is disabled to attenuate acoustic noise while controlling the spindle motor in response to a wedge speed error generated from the servo wedges.

DESCRIPTION OF THE PREFERRED EMBODIMENTS

Figure 3:
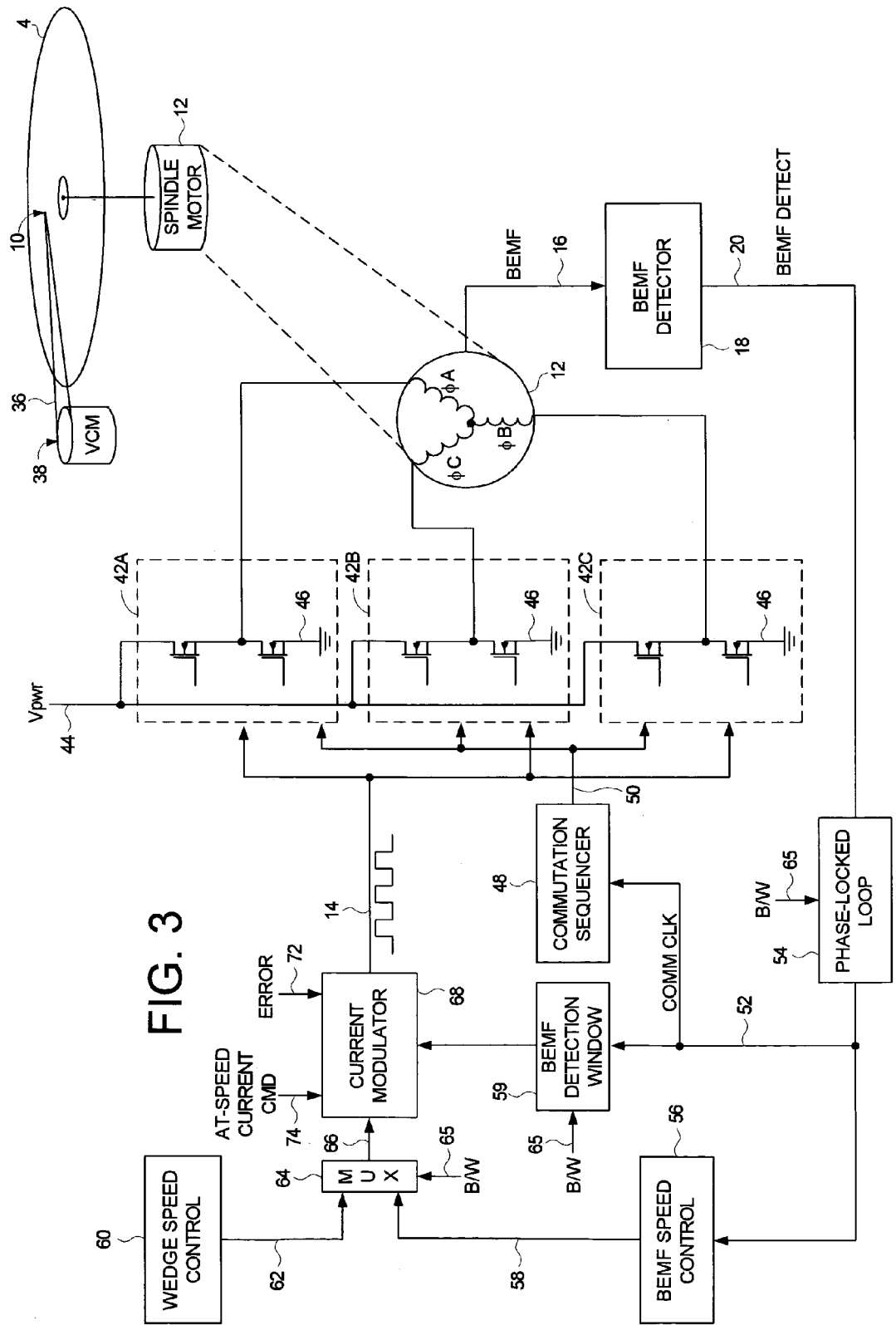
FIG. 3 shows further details of the spindle control circuitry according to an embodiment of the present invention including a BEMF detector, a phased-locked-loop, BEMF detection window circuitry, a commutation sequencer, and a current modulator for generating a PWM current control signal.

FIGS. 1A and 1B show a disk drive 2 according to an embodiment of the present invention comprising a disk 4 having a plurality of tracks 6, wherein each track 6 comprises a plurality of data sectors and a plurality of servo wedges 8. A head 10 is actuated over the disk 4, and a spindle motor 12 rotates the disk 4 at an operating speed in response to a spindle control current 14, the spindle motor 12 comprising a plurality of windings which generate a back electromotive force (BEMF) voltage 16. A BEMF detector 18 generates a BEMF signal 20 by comparing the BEMF voltage 16 to a threshold. A current modulator 68 (FIG. 3) generates a PWM signal representing the spindle control current 14, and BEMF detection window circuitry 59 periodically disables the PWM signal for a predetermined interval to attenuate noise in the BEMF voltage 16 while the BEMF detector 18 compares the BEMF voltage 16 to the threshold. A disk controller 22 executes the steps of the flow diagram shown in FIG. 2 to control the spindle motor 12 by generating the spindle control current 14 during a BEMF spindle speed control mode or a wedge spindle speed control mode. At step 24, a BEMF speed error is generated in response to the BEMF signal 20 during the BEMF spindle speed control mode, and the spindle control current 14 is updated in response to the BEMF speed error to drive the disk 4 at the operating speed. At step 26, the BEMF detection window circuitry 59 is disabled to reduce acoustic noise and the spindle motor 12 is operated in a wedge spindle speed control mode. A wedge speed error is generated in response to the servo wedges, and the disk 4 is maintained at the operating speed by updating the spindle control current 14 in response to the wedge speed error. If an error condition is detected at step 28, the BEMF detection window circuitry 59 is enabled at step 30 and the disk 4 is maintained at the operating speed by updating the spindle control current 14 in response to the BEMF speed error generated from the BEMF signal 20. When the error condition subsides at step 32, the BEMF detection window circuitry 59 is disabled at step 34 and the disk 4 is maintained at the operating speed by updating the spindle control current 14 in response to the wedge speed error generated from the servo wedges 8.

In the embodiment of FIGS. 1A and 1B, the head 10 is connected to a distal end of an actuator arm 36 which is rotated about a pivot by a voice coil motor (VCM) 38 in order to actuate the head 10 radially over the disk 4. A read channel 40 processes the read signal emanating from the head 10 and generates an estimated binary sequence representing the data recorded on the disk 4. The read channel 40 also detects the occurrence of the servo wedges 8 used to update a wedge counter. The read channel 40 may be implemented as a separate integrated circuit, or integrated with the disk controller 22 in a "system on a chip". Similarly, the BEMF detector 18 may be integrated into the disk controller 22 or implemented in a separate servo controller chip.

FIG. 3 shows a spindle motor 12 according to an embodiment of the present invention comprising three windings connected at a center tap forming three phases ($\phi A$, $\phi B$, $\phi C$); however, any suitable spindle motor comprising any suitable number of windings in any suitable configuration implementing any suitable number of phases may be employed. FIG. 3 also shows details of spindle driver circuitry comprising three sets of commutation switches 42A–42C each comprising a first field effect transistor (FET) for connecting a respective winding to a power supply Vpwr 44 and a second FET for connecting the respective winding to ground 46. A commutation sequencer 48 generates a control signal 50 applied to the commutation switches 42A–42C in order to drive current from the power supply 44 through the appropriate windings to ground 46 as determined from the commutation state. The commutation sequencer 48 may control the commutation switches 42A–42C in any suitable manner, such as in a conventional bipolar commutation sequence, tripolar commutation sequence, or hybrid bipolar-tripolar commutation sequence as disclosed in U.S. Pat. No. 5,808,440, the disclosure of which is incorporated herein by reference.

Figure 4:
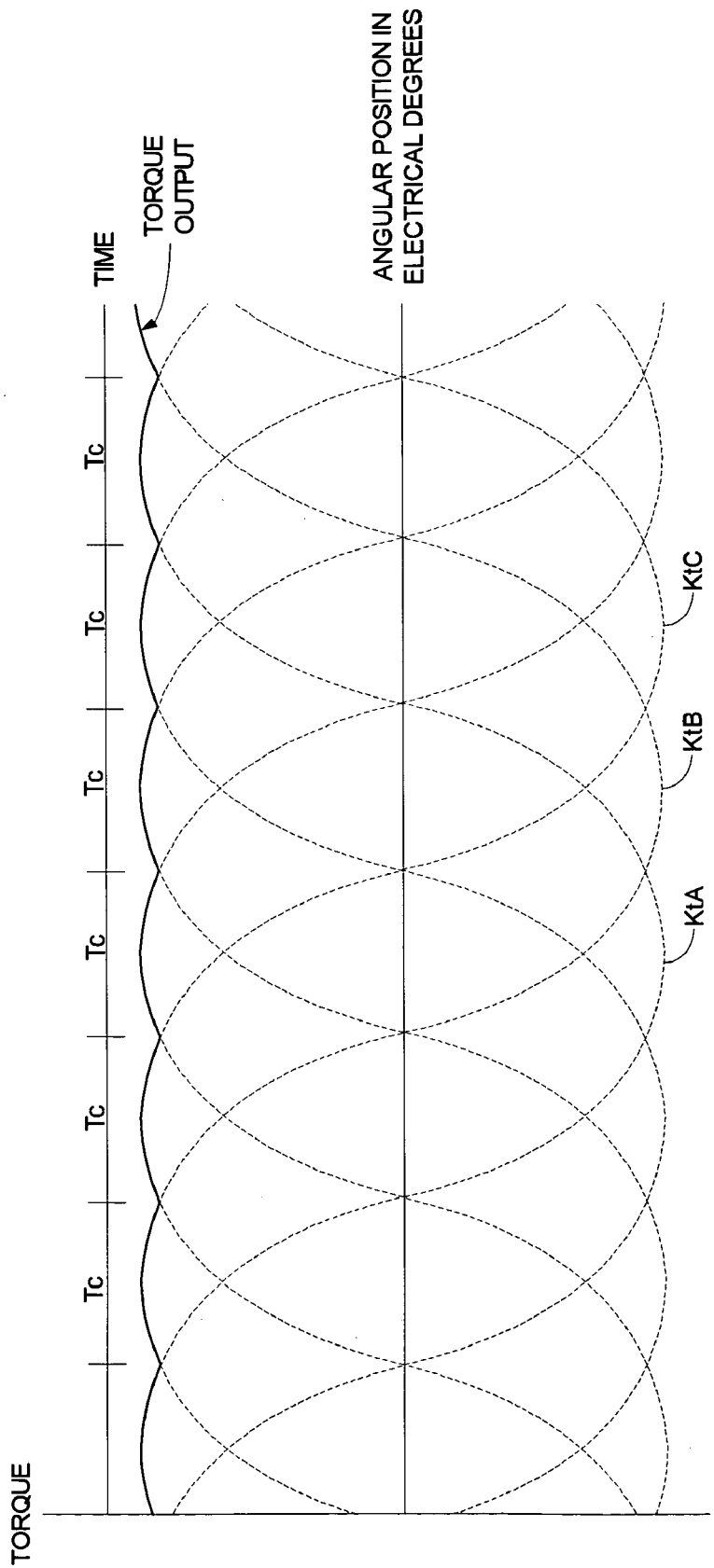
FIG. 4 is a waveform showing the torque curves generated by the windings of a three-phase spindle motor and an associated commutation interval.

The amount of torque generated by the spindle motor 12 is determined by the angular position of the rotor with respect to the stator, the magnitude of the current driving the windings, and a torque constant Kt. The torque constant Kt is a function of the number of turns in the windings as well as the strength of the permanent magnets. FIG. 4 illustrates the torque curves for the three-phase spindle motor 12 of FIG. 3, where the three dashed-line sine waves KtA, KtB, and KtC correspond to the torque profile for each phase of the spindle motor. The desired torque output (shown as a solid line) is generated by changing the commutation state at the appropriate commutation interval Tc.

The appropriate commutation interval can be determined by detecting zero crossings in the BEMF voltage 16 generated by the un-energized winding. In FIG. 3, a commutation clock 52 is generated by a phase-locked-loop (PLL) 54 which locks onto the frequency of the BEMF zero crossings signal 20. The commutation clock 52 is applied to the commutation sequencer 48 and a BEMF speed control block 56. The BEMF speed control block 56 computes the BEMF speed error as the difference between an actual and desired frequency of the BEMF zero crossings signal 20, and implements a compensator for generating a BEMF spindle control current command 58 in response to the BEMF speed error. A current modulator 68 adjusts a duty cycle of a PWM signal 14 (spindle control current 14 in FIG. 1A) in response to the BEMF spindle control current command 58 which controls the amount of current flowing through the energized windings, and therefore the amount of torque output and speed of the spindle motor 12. BEMF detection window circuitry 59 periodically disables the PWM signal 14 (e.g., holds the PWM signal 14 high) for a predetermined interval (detection window) to attenuate noise in the BEMF voltage 16 while the BEMF detector 18 compares the BEMF voltage 16 to the threshold. In the embodiment of FIG. 3, the timing of the BEMF detection window is determined from the commutation clock 52.

A wedge speed control block 60 generates the wedge speed error in response to the servo wedges 8 and the reference time period. The wedge speed control block 60 implements a compensator for generating a wedge spindle control current command 62 in response to the wedge speed error. In one embodiment, the compensator implemented in the wedge speed control block 60 has a higher bandwidth than the compensator implemented by the BEMF speed control block 56.

A multiplexer 64 controlled by signal B/W 65 selects between the BEMF spindle control current command 58 and the wedge spindle control current command 62 as the control current command 66 applied to the current modulator 68. During an error condition 72, the current modulator 68 fixes the duty cycle of the PWM signal 14 in response to an at-speed current command 74 so that the at-speed current is applied to the windings.

In this embodiment, the B/W signal 65 also disables the BEMF detection window circuitry 59 while the speed of the spindle motor 12 is controlled in response to the wedge speed error. This helps reduce acoustic noise caused by current transients that occur when the PWM signal 14 is disabled (e.g., held high) during the detection window. In one embodiment while the BEMF detection window circuitry 59 disabled, the B/W signal 65 configures the PLL 54 to output a fixed frequency commutation clock 52 corresponding to the at-speed frequency. In an alternative embodiment, the PLL 54 continues to generate the commutation clock 52 in response to the BEMF signal 20 even though it may be less reliable due to the noise induced into the BEMF voltage 16 by the switching action of the PWM signal 14.

Figure 5:
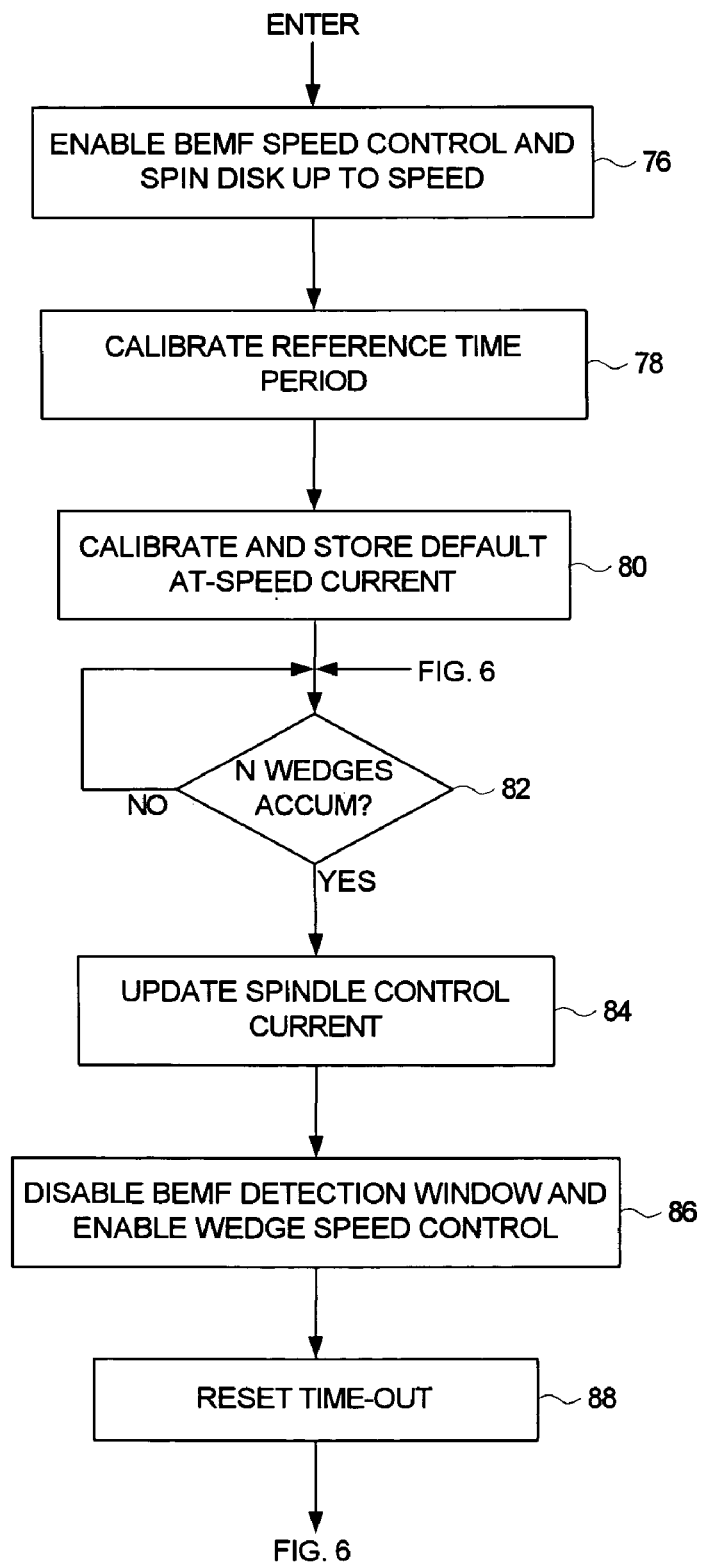
FIG. 5 is a flow diagram according to an embodiment of the present invention for spinning the disk up to the operating speed, calibrating a default at-speed current, and switching from BEMF spindle speed control to wedge spindle speed control.

In one embodiment, a wedge time counter is incremented at a predetermined frequency. A predetermined number of wedge time counter values are accumulated representing a predetermined number of wedge-to-wedge times to generate a wedge time period. This embodiment is illustrated in the flow diagram of FIGS. 5 and 6. At step 76 the BEMF detector 18 is enabled and the disk 4 is spun up to the operating speed by updating the spindle control current 14 in response to the BEMF speed error 58. Once the disk 4 is rotating at the operating speed (substantially zero BEMF speed error 58), a reference time period is calibrated at step 78. In this embodiment, the reference time period is generated by accumulating a predetermined number of wedge time counter values. That is, as each servo wedge 8 is detected, the wedge time counter value is summed into the reference time period (unless a servo wedge error is encountered as described below, in which case the wedge time counter value is ignored). In one embodiment, the wedge time counter is reset at each servo wedge 8, and in another embodiment, the wedge time counter is free running and the wedge-to-wedge time is determined from the incremented wedge time counter value from wedge to wedge.

At step 80 a default at-speed current is calibrated which is the spindle control current 14 that generates a substantially zero BEMF speed error. The default at-speed current is used as the spindle control current 14 if an error condition is detected immediately after transitioning into the wedge speed control mode. Otherwise, the at-speed current is updated while the wedge speed error is substantially zero when controlling the spindle motor 12 in the wedge speed control mode.

While in the BEMF spindle speed control mode, the wedge time counter values are accumulated until at step 82 N wedge-to-wedge times have been accumulated into a wedge time period. If so at step 84 the spindle control current 14 is updated in response to the wedge speed error computed by subtracting the wedge time period from the reference time period. At step 86 the BEMF detection window circuitry 59 is disabled, the wedge spindle speed control mode is enabled, and at step 88 a time-out counter for timing a time-out interval is reset. Any suitable time-out interval may be employed. In one embodiment, N wedge time counter values are accumulated to generate the wedge speed error, and the time-out interval is configured to M*N servo wedges 8 (where M is greater than 1 e.g., 1.5). That is, an error condition is detected if N wedge time counter values have not been accumulated within M*N servo wedges 8.

Figure 6:
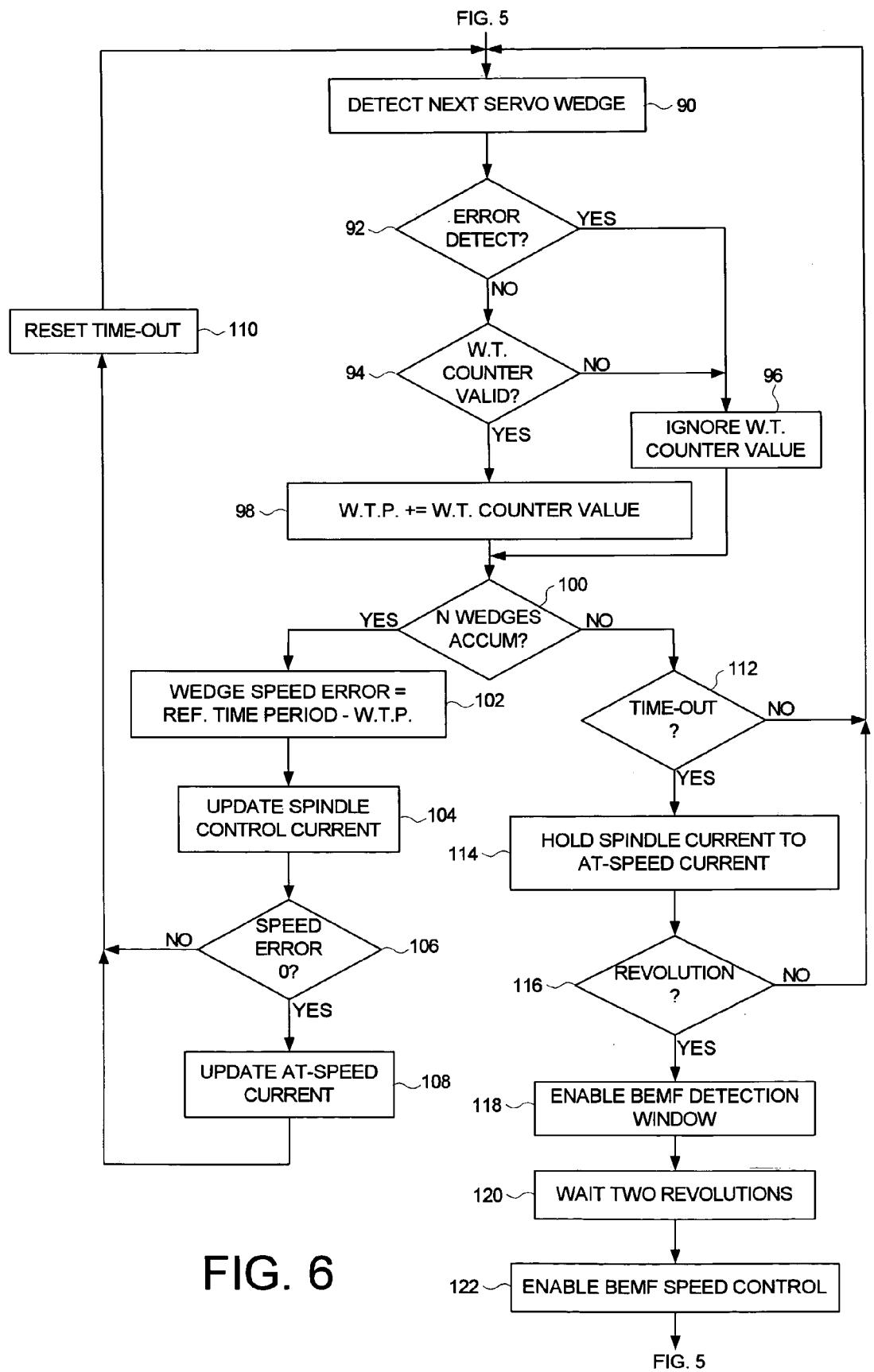
FIG. 6 is a flow diagram according to an embodiment of the present invention wherein a spindle control current is updated in response to a wedge speed error generated by accumulating a predetermined number of wedge-to-wedge times to generate a wedge time period and comparing the wedge time period to a reference time period.

Control then continues at step 90 of FIG. 6 wherein the next servo wedge 8 is detected. If a servo wedge error occurs, which may include an inability to synchronize to a servo wedge due to a burst error or detection of a bad track ID at step 92, or a bad wedge time counter value at step 94, then at step 96 the wedge time counter value is ignored. A bad wedge time counter value may be detected at step 94, for example, if a servo wedge is missed altogether. If a servo wedge error is not detected, then at step 98 the wedge counter value is summed into a wedge time period (W.T.P.). If at step 100 N wedge time counter values have been accumulated, then at step 102 the wedge speed error is computed by subtracting the wedge time period from the reference time period. At step 104 the spindle control current 14 is updated in response to the wedge speed error. If at step 106 the wedge speed error is zero (or substantially zero), then at step 108 the at-speed current is updated with the spindle control current 14. Some form of averaging may be employed to filter noisy or erroneous spindle control current values. At step 110 the timer for timing the time-out interval is reset, and the process continues at step 90.

If at step 100 N wedge time counter values have not been accumulated and at step 112 the time-out interval expires, then an error condition is detected and at step 114 the spindle control current 14 is set to the at-speed current. Setting the spindle control current 14 to the at-speed current helps maintain the disk at the operating speed until the error condition subsides. If at step 116 a revolution of the disk 4 has not occurred without updating the spindle control current 14, then control branches back to step 90 to detect the next servo wedge. Because the time-out interval has not been reset, control will branch to step 112 and step 114 until N wedge time counter values have been accumulated at step 100. However, if at step 116 an entire revolution of the disk 4 has occurred before N wedge time counter values are accumulated, then the disk controller 22 transitions back into the BEMF spindle speed control mode. At step 118 the BEMF detection window circuitry 59 is enabled, and after waiting two revolutions of the disk 4 at step 120 to allow the BEMF speed error 58 to settle, the BEMF spindle speed control mode is enabled at step 122 and control branches to step 82 of FIG. 5. The disk controller 22 remains in the BEMF spindle speed control mode until again N wedge time counter values are accumulated at step 82 and the spindle control current 14 is updated at step 84.

In one embodiment, the disk controller 22 switches from the wedge spindle speed control mode to the BEMF spindle speed control mode without having detected an error. For example, during a calibration procedure the disk controller 22 may seek the head 10 to a calibration track where the timing between servo wedges 8 changes such that the reference time period is no longer valid. In addition, the disk controller 22 may switch from wedge spindle speed control to BEMF spindle speed control to perform certain test during manufacturing, such as resonance discover of the spindle motor 12. After disabling the wedge spindle speed control mode the disk controller 22 sets the spindle control current 14 to the at-speed current 74 for a predetermined interval (e.g., two revolutions of the disk) to allow the BEMF speed error 58 to settle. Once the BEMF speed error 58 settles, the disk controller 22 can transition safely into the BEMF spindle speed control mode.

We claim:

1. A disk drive comprising:
   (a) a disk comprising a plurality of tracks, wherein each track comprises a plurality of data sectors and a plurality of servo wedges;
   (b) a head actuated over the disk;
   (c) a spindle motor for rotating the disk at an operating speed in response to a spindle control current, the spindle motor comprising a plurality of windings which generate a back electromotive force (BEMF) voltage;
   (d) a BEMF detector for generating a BEMF signal by comparing the BEMF voltage to a threshold;
   (e) a current modulator for generating a PWM signal representing the spindle control current;
   (f) BEMF detection window circuitry for periodically disabling the PWM signal for a predetermined interval to attenuate noise in the BEMF voltage while the BEMF detector compares the BEMF voltage to the threshold; and
   (g) a disk controller for:
      measuring a BEMF speed error responsive to the BEMF signal during a BEMF spindle speed control mode;
      updating the spindle control current in response to the BEMF speed error to drive the disk at the operating speed;
      disabling the BEMF detection window circuitry to reduce acoustic noise and switching to a wedge spindle speed control mode;
      measuring a wedge speed error in response to the servo wedges;
      maintaining the disk at the operating speed by updating the spindle control current in response to the wedge speed error;
      if an error condition is detected, enabling the BEMF detection window circuitry and maintaining the disk at the operating speed by updating the spindle control current in response to the BEMF speed error generated from the BEMF signal; and
      when the error condition subsides, disabling the BEMF detection window circuitry and maintaining the disk at the operating speed by updating the spindle control current in response to the wedge speed error generated from the servo wedges.

2. The disk drive as recited in claim 1, wherein the error condition occurs if the spindle control current is not updated within a predetermined interval.

3. The disk drive as recited in claim 2, wherein the spindle control current is not updated if a servo wedge error is detected.

4. The disk drive as recited in claim 3, wherein the servo wedge error includes an inability to synchronize to a servo wedge.

5. The disk drive as recited in claim 3, wherein the servo wedge error includes detecting an invalid track identification value in servo wedge.

6. The disk drive as recited in claim 1, further comprising a commutation sequencer for energizing the windings in a predetermined commutation sequence, wherein:
   (a) the commutation sequencer is clocked in response to the BEMF signal while the BEMF detection window circuitry is enabled; and
   (b) the commutation sequencer is clocked at a fixed frequency while the BEMF detection window circuitry is disabled.

7. The disk drive as recited in claim 6, further comprising a phase-locked-loop (PLL) for generating a commutation clock for clocking the commutation sequencer, wherein:
   (a) the PLL locks a frequency of the commutation clock to a frequency of the threshold crossings in the BEMF signal while the BEMF detection window circuitry is enabled; and
   (b) the PLL holds the commutation clock at a fixed frequency while the BEMF detection window circuitry is disabled.

8. The disk drive as recited in claim 1, further comprising a commutation sequencer for energizing the windings in a predetermined commutation sequence, wherein the commutation sequencer is clocked in response to the BEMF signal while the BEMF detection window circuitry is enabled and while the BEMF detection window circuitry is disabled.

9. The disk drive as recited in claim 1, wherein after the error condition is detected the disk controller waits a predetermined interval for the BEMF speed error to settle before updating the spindle control current in response to the BEMF speed error.

10. A method of operating a disk drive, the disk drive comprising a disk comprising a plurality of tracks, wherein each track comprises a plurality of data sectors and a plurality of servo wedges, a head actuated over the disk, a spindle motor for rotating the disk at an operating speed in response to a spindle control current, the spindle motor comprising a plurality of windings which generate a back electromotive force (BEMF) voltage, a BEMF detector for generating a BEMF signal by comparing the BEMF voltage to a threshold, a current modulator for generating a PWM signal representing the spindle control current, and BEMF detection window circuitry for periodically disabling the PWM signal for a predetermined interval to attenuate noise in the BEMF voltage while the BEMF detector compares the BEMF voltage to the threshold, the method comprising the steps of:
  (a) measuring a BEMF speed error responsive to the BEMF signal during a BEMF spindle speed control mode;
  (b) updating the spindle control current in response to the BEMF speed error to drive the disk at the operating speed;
  (c) disabling the BEMF detection window circuitry to reduce acoustic noise and switching to a wedge spindle speed control mode;
  (d) measuring a wedge speed error in response to the servo wedges;
  (e) maintaining the disk at the operating speed by updating the spindle control current in response to the wedge speed error;
  (f) if an error condition is detected, enabling the BEMF detection window circuitry and maintaining the disk at the operating speed by updating the spindle control current in response to the BEMF speed error generated from the BEMF signal; and
  (g) when the error condition subsides, disabling the BEMF detection window circuitry and maintaining the disk at the operating speed by updating the spindle control current in response to the wedge speed error generated from the servo wedges.

11. The method as recited in claim 10, wherein the error condition occurs if the spindle control current is not updated within a predetermined interval.

12. The method as recited in claim 11, wherein the spindle control current is not updated if a servo wedge error is detected.

13. The method as recited in claim 12, wherein the servo wedge error includes an inability to synchronize to a servo wedge.

14. The method as recited in claim 12, wherein the servo wedge error includes detecting an invalid track identification value in a servo wedge.

15. The method as recited in claim 10, further comprising the step of energizing the windings in a predetermined commutation sequence at a commutation frequency, wherein:
  (a) the commutation frequency is generated in response to the BEMF signal while the BEMF detection window circuitry is enabled; and
  (b) the commutation frequency is a fixed frequency while the BEMF detection window circuitry is disabled.

16. The method as recited in claim 10, further comprising the step of energizing the windings in a predetermined commutation sequence at a commutation frequency, wherein the commutation frequency is generated in response to the BEMF signal while the BEMF detection window circuitry is enabled and while the BEMF detection window circuitry is disabled.

17. The method as recited in claim 10, wherein after the error condition is detected further comprising the step of waiting a predetermined interval for the BEMF speed error to settle before updating the spindle control current in response to the BEMF speed error.

* * * * *